US012648544B2

(12) United States Patent

Ibarra et al.

(10) Patent No.: US 12,648,544 B2

(45) Date of Patent: Jun. 9, 2026

(54) METHOD FOR OXYGEN-DOPING OF POULTRY DRINKING WATER WITH CALCIUM CARBONATE CONTROL

(71) Applicants: L'AIR LIQUIDE, SOCIETE ANONYME POUR L'ETUDE ET L'EXPLOITATION DES PROCEDES GEORGES CLAUDE, Paris (FR); AIR LIQUIDE FRANCE INDUSTRIE, Paris (FR)

(72) Inventors: Dominique Ibarra, Less Loges-en-Josas (FR); Philippe Campo, Bagneux (FR); Franck Cousin, Loos (FR); Pauline Le Dru, Carquefou (FR)

(73) Assignees: L'Air Liquide, Societe Anonyme pour l'Etude et l'Exploitation des Procédés Georges Claude, Paris (FR); Air Liquide France Industrie, Paris (FR)

( * ) Notice: Subject to any disclaimer, the term of this patent is extended or adjusted under 35 U.S.C. 154(b) by 0 days.

(21) Appl. No.: 18/273,495

(22) PCT Filed: Jan. 17, 2022

(86) PCT No.: PCT/EP2022/050837

§ 371 (c)(1),
(2) Date: Jul. 20, 2023

(87) PCT Pub. No.: WO2022/157096

PCT Pub. Date: Jul. 28, 2022

(65) Prior Publication Data

US 2024/0138370 A1 May 2, 2024

(30) Foreign Application Priority Data

Jan. 21, 2021 (FR) ..................................... 2100566

(51) Int. Cl.
| | |
|---|---|
| *B01F 23/237* | (2022.01) |
| *A01K 7/02* | (2006.01) |
| *A01K 39/02* | (2006.01) |
| *C02F 1/68* | (2023.01) |
| *B01F 101/00* | (2022.01) |

(52) U.S. Cl.
CPC ................ *A01K 7/02* (2013.01); *A01K 39/02* (2013.01); *B01F 23/237612* (2022.01); *B01F 23/23762* (2022.01); *C02F 1/68* (2013.01); *B01F 2101/305* (2022.01)

(58) Field of Classification Search
CPC . A01K 7/00; A01K 7/02; A01K 39/00; A01K 39/02; A01K 29/00
See application file for complete search history.

(56) References Cited

U.S. PATENT DOCUMENTS

| | | | |
|---|---|---|---|
| 6,063,295 | A | 5/2000 | Williams |
| 6,096,221 | A | 8/2000 | Kerchouche et al. |
| 2021/0002155 | A1* | 1/2021 | Pashley ..................... C02F 1/68 |

FOREIGN PATENT DOCUMENTS

| | | | |
|---|---|---|---|
| EP | 0 764 612 | 3/1997 | |
| EP | 3 639 659 | 4/2020 | |
| FR | 2 767 522 | 2/1999 | |
| WO | WO-2019097142 A1 * | 5/2019 | ............. A01K 39/02 |

OTHER PUBLICATIONS

International Search Report and Written Report for PCT/EP2022/050837, mailed Apr. 4, 2022.
French Search Report for FR 2 100 566, mailed Sep. 20, 2021.

* cited by examiner

*Primary Examiner* — Peter M Poon
*Assistant Examiner* — Carly W. Lynch
(74) *Attorney, Agent, or Firm* — Yan Jiang

(57) ABSTRACT

The invention relates to a method for rearing animals and in particular poultry or pigs that comprises supplying the animals with drinking water in order to water the animals, injecting oxygen and $CO_2$ into the drinking water, before the drinking water reaches the animals, according to one of the following modes: two injections, one of $CO_2$ and one of oxygen, are carried out simultaneously into the drinking water, or one injection, a mixture of oxygen and $CO_2$, is carried out into the drinking water.

2 Claims, No Drawings

METHOD FOR OXYGEN-DOPING OF POULTRY DRINKING WATER WITH CALCIUM CARBONATE CONTROL

CROSS-REFERENCE TO RELATED APPLICATIONS

This application is a § 371 of International PCT Application PCT/EP2022/050837, filed Jan. 17, 2022, which claims § 119(a) foreign priority to French patent application FR 2100566, filed Jan. 21, 2021.

FIELD OF THE INVENTION

The present invention relates to the field of animal rearing, and in particular the rearing of poultry and pigs or also rabbits, and is very particularly concerned with the question of their watering.

BACKGROUND

The applicant company has carried out numerous studies on this question; reference may in particular be made to the document EP-3 709 793 (WO2019097142).

Thus the studies carried out since the technical proposal which had been developed in this prior document showed that a deposit could be formed in the tank containing the oxygenated drinking water. The analytical methods used demonstrated the formation of various carbonates, in particular calcium and potassium carbonates.

The formation of these carbonates is explained by a phenomenon of loss of $CO_2$ (phenomenon known as "stripping"): this is because, when a gas is injected into a liquid, the gas bubbles which do not dissolve and which leave for the atmosphere will, while passing through the liquid, want to come into equilibrium with the (volatile) compounds present in the liquid, in particular the gases. Considering here the oxygen which is injected into the water, the portion of the bubbles which leave for the atmosphere, when they pass through the water, will capture the other gases (nitrogen and $CO_2$) to tend towards equilibrium and will thus deplete the water of free $CO_2$.

This loss of $CO_2$ promotes the deposition of calcareous matter.

SUMMARY OF THE INVENTION

The present invention thus attempts to provide a solution for solving this phenomenon of formation of calcareous deposits. As will be seen in what follows, this solution also makes it possible to limit the formation of biofilm, in particular in the water supply network of the rearing site.

For this, the solution provided here consists in enriching the water in $CO_2$ by injecting an $O_2/CO_2$ mixture instead of injecting only oxygen. Thus, the carbonates are transformed into bicarbonates, which are soluble and nonencrusting.

In general, with regard to water having an average composition, that is to say for a TAC of between 10 and 30° f and a TH of between 15 and 40° f, it can be considered that having available a content of dissolved $CO_2$ of between 3 and 20 mg/l makes it possible to prevent the deposition of scale.

DETAILED DESCRIPTION OF THE INVENTION

The present invention provides several advantageous solutions for the implementation of such an injection.

It is in particular possible to inject a gas mixture with a fixed percentage of $CO_2$ in an oxygen-rich gas, in order to keep constant a level of dissolved $CO_2$.

Thus, by way of example, for water at atmospheric pressure at 20° C., an injection of a mixture having 1% of $CO_2$ in oxygen will make it possible, at equilibrium, to maintain approximately 17 mg/l of dissolved $CO_2$ and thus to avoid the formation of scale deposits.

Quite clearly, it is possible, instead of injecting a gas mixture, to simultaneously inject an oxygen flow and a $CO_2$ flow representing 1% of the oxygen flow in order to obtain the same result.

According to an advantageous mode, for precise control of the injection of $CO_2$, in particular when the injection of the $CO_2$ gas is carried out separately from the injection of the oxygen, it is possible, by a pH measurement, to optimize the injection in order to obtain a level of dissolved $CO_2$ in conformity with the targeted objective in order to prevent the formation of scale deposits.

The advantages offered by the invention can be summarized in the following way:

the reduction in the phenomenon of formation of calcareous matter, great simplicity of implementation, the formation of biofilm is limited due to the drop in pH and due to the absence of microstructures which can be the center of bacterial growth, the contribution of bicarbonates is advantageous for facilitating the digestion of the animals.

It is possible, with this coinjection of oxygen and $CO_2$, in particular for higher levels of dissolved $CO_2$, to benefit from the combined effects of water rich in oxygen and in $CO_2$ for the feeding of animals and in particular poultry.

And it is all the credit of the present invention to have understood that it was not enough, in hoping to overcome this problem of calcareous matter, to simply inject one gas and then the other, admittedly implemented most simply but which, according to the applicant company, would not have made it possible to achieve an optimum result.

This is because:

if the $CO_2$ is injected, followed by the oxygen, the injection of oxygen would cause the $CO_2$ to desorb, conversely, an injection of $CO_2$ occurring after an injection of oxygen, if it goes beyond saturation in $CO_2$, would cause the oxygen to desorb.

It is thus the merit of the present invention to have understood and demonstrated the advantage of the simultaneous injection of the two gases using a mixture.

Moreover, it is possible to imagine the existence of a synergy at the level of the yield of the transfers on combining $O_2$ and $CO_2$, i.e. contributing more than a simple addition of the effects of both of the gases.

The invention thus relates to a method for rearing animals and in particular poultry or pigs, where water is supplied to the animals in order to water them, which is characterized in that oxygen and $CO_2$ are injected into the drinking water, before the latter reaches the animals, according to one of the following modes:

two injections, one of $CO_2$ and one of oxygen, are carried out simultaneously into the water;

the injection into the water of a mixture of oxygen and $CO_2$ is carried out.

The mixture advantageously comprises between 1% and 30% of $CO_2$.

The invention also relates to a process for enriching in $O_2$ and $CO_2$ the drinking water of a rearing site, equipped with an automatic animal watering system, for example of the "dropper" type.

It is possible to envisage according to the invention carrying out the injection in line, in the feed line, upstream of the point where the animals come to drink, by employing, as well known to a person skilled in the art of these techniques for injection of gases into liquids, a contact time sufficient to carry out the dissolution.

Still by way of illustration, it is also possible to envisage according to the invention carrying out the injection in a holding tank often present in this type of rearing site, or also in the technical premises for water treatment present on such installations.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

"Optional" or "optionally" means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range. Any and all ranges recited herein are inclusive of their endpoints (i.e., x=1 to 4 or x ranges from 1 to 4 includes x=1, x=4, and x=any number in between), irrespective of whether the term "inclusively" is used.

All references identified herein are each hereby incorporated by reference into this application in their entireties, as well as for the specific information for which each is cited.

What is claimed is:

1. A method for oxygen-doping of poultry drinking water with calcium carbonate control, the method comprising
   supplying the animals with drinking water; and
   injecting oxygen and $CO_2$ into the drinking water, before the drinking water reaches the animals, according to the following mode:
   one injection of a mixture of oxygen and $CO_2$ is carried out, wherein the mixture of oxygen and $CO_2$ contains a fixed percentage of $CO_2$ to keep a constant level of dissolved $CO_2$ of between 3 and 20 mg/L in the drinking water, thereby avoiding formation of calcium carbonate.

2. The method of claim 1, wherein the fixed percentage of $CO_2$ is 1%, so that at atmospheric pressure, at 20° C., at equilibrium, the constant level of dissolved $CO_2$ in the drinking water is maintained at approximately 17 mg/l.

* * * * *